United States Patent
Shan

(10) Patent No.: US 7,809,781 B1
(45) Date of Patent: Oct. 5, 2010

(54) DETERMINING A TIME POINT CORRESPONDING TO CHANGE IN DATA VALUES BASED ON FITTING WITH RESPECT TO PLURAL AGGREGATE VALUE SETS

(75) Inventor: Jerry Z. Shan, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1464 days.

(21) Appl. No.: 11/118,832

(22) Filed: Apr. 29, 2005

(51) Int. Cl.
*G06F 7/00* (2006.01)
(52) U.S. Cl. .................................. 708/200
(58) Field of Classification Search ........... 708/200, 708/422–446
See application file for complete search history.

(56) References Cited

U.S. PATENT DOCUMENTS

| | | | | |
|---|---|---|---|---|
| 5,218,299 | A * | 6/1993 | Dunkel | 324/307 |
| 5,983,251 | A * | 11/1999 | Martens et al. | 708/203 |
| 6,132,969 | A * | 10/2000 | Stoughton et al. | 506/8 |
| 6,454,729 | B1 | 9/2002 | Jacobs | |
| 6,772,181 | B1 * | 8/2004 | Fu et al. | 708/313 |
| 6,985,779 | B2 | 1/2006 | Hsiung | |
| 7,046,474 | B2 | 5/2006 | Jin | |
| 7,047,089 | B2 | 5/2006 | Martin | |
| 7,308,385 | B2 | 12/2007 | Wegerich | |
| 7,346,593 | B2 * | 3/2008 | Takeuchi et al. | 708/446 |
| 7,587,330 | B1 | 9/2009 | Shan | |
| 2003/0233273 | A1 | 12/2003 | Jin et al. | |
| 2004/0015458 | A1 | 1/2004 | Takeuchi et al. | |
| 2005/0069207 | A1 * | 3/2005 | Zakrzewski et al. | 382/190 |
| 2005/0143873 | A1 | 6/2005 | Wilson | |
| 2005/0203360 | A1 | 9/2005 | Brauker | |
| 2006/0074817 | A1 | 4/2006 | Shan | |

OTHER PUBLICATIONS

Shan et al., U.S. Appl. No. 10/322,201, entitled "Method and System for Predicting Revenue Based on Historical Pattern Identification and Modeling," filed Dec. 17, 2002, pp. 1-22, Figs. 1-8.

Shan et al., U.S. Appl. No. 10/355,353, entitled "Method and System for Constructing Prediction Interval Based on Historical Forecast Errors," filed Jan. 31, 2003, pp. 1-21, Figs. 1-6.

Shan et al., U.S. Appl. No. 10/959,861, entitled "Methods and Systems for Cumulative Attribute Forecasting Using a PDF of a Current-To-Future Value Ratio," filed Oct. 6, 2004, pp. 1-18, Figs. 1-6.

BEA WebLogic Server Capacity Planning Guide, Rel. 8.1, 54 pages, Jun. 16, 2003.

J.Z. Shan, "Sequential Detection of Parameter Changes in Linear Dynamic Systems and Regression Models," pp. 1-75 (1995).

J. Shan, U.S. Appl. No. 11/047,283, entitled "Detecting Change in Data," filed Jan. 31, 2005, pp. 1-26, Figs. 1-6.

(Continued)

*Primary Examiner*—Chat C Do

(57) ABSTRACT

Aggregation of data values in a data set is computed to produce aggregate values. The aggregate values are partitioned into plural aggregate value sets. Fitting with respect to the plural aggregate value sets is performed. Based on the fitting, at least one time point corresponding to occurrence of a change in the data values is determined.

22 Claims, 6 Drawing Sheets

OTHER PUBLICATIONS

J. Shan, U.S. Appl. No. 11/047,231, entitled "Performing Quality Determination of Data," filed Jan. 31, 2005, pp. 1-32, Figs. 1-6.

http://www.stat.yale.edu/Courses/1997-98/101/linreg.htm, "Linear Regression," pp. 1-3 (at least as early as Apr. 6, 2005).

J.Z. Shan, U.S. Appl. No. 11/117,989 entitled "Performing Quality Determination of Data," filed Apr. 29, 2005, pp. 1-32, Figs. 1-9.

U.S. Appl. No. 11/117,989, Office Action dated Jan. 25, 2007, pp. 1-14.

U.S. Appl. No. 11/117,989, Office Action dated Jun. 6, 2007, pp. 1-14.

U.S. Appl. No. 11/117,989, Office Action dated Jan. 3, 2008, pp. 1-11.

U.S. Appl. No. 11/117,989, Final Rejection dated Jul. 9, 2008, pp. 1-10.

U.S. Appl. No. 11/117,989, Notice of Allowance dated Nov. 3, 2008 (6 pages).

U.S. Appl. No. 11/119,037 entitled "Detecting Change in Data" filed April 29, 2005 (33 pages).

U.S. Appl. No. 11/119,037, Office Action dated Jun. 25, 2009, pp. 1-11 and attachments.

* cited by examiner

DETERMINING A TIME POINT CORRESPONDING TO CHANGE IN DATA VALUES BASED ON FITTING WITH RESPECT TO PLURAL AGGREGATE VALUE SETS

BACKGROUND

Companies or other organizations often gather data into data repositories, such as databases or data warehouses, for analysis to discover hidden data attributes, trends, patterns, or other characteristics. Such analysis is referred to as data mining, which is performed by companies or other organizations for planning purposes, for better understanding of customer behavior, or for other purposes.

It is often useful to detect for a "structural" or "systematic" change in observed data from a particular data source or database. A "systematic" or "structural" change in data results from some change in a particular system that produced the data, where such change results from an underlying change in the system rather than from changes due to normal operation of the system. The term "systematic change" is often used in the industry context, whereas the term "structural change" is often used in the economics context. In this description, the terms "systematic change" and "structural change" are interchangeably used and refer to any change in data that results from a change in the system that produced the data.

Detecting a systematic change of data involves change-point detection, which identifies the point in time of the change. Conventionally, change-point detection has employed a model that assumes a constant mean for observed data values before the change, a different constant mean for the observed data values after the change, and a constant variance for the observed data values. A shift in the calculated constant means or constant variance has conventionally been used as an indication that a systematic change has occurred.

Some other forms of change-point algorithms detect change points based on comparing aggregate values (computed from aggregations of data values) against a threshold. With such algorithms, a change point can be detected based on the crossing of the threshold by the aggregate values. However, it is often difficult to accurately set an optimal threshold value. An incorrectly set threshold may result in inaccurate or late detection of a change point.

BRIEF DESCRIPTION OF THE DRAWINGS

Some embodiments of the invention are described with reference to the following figures.

DETAILED DESCRIPTION

Figure 1:
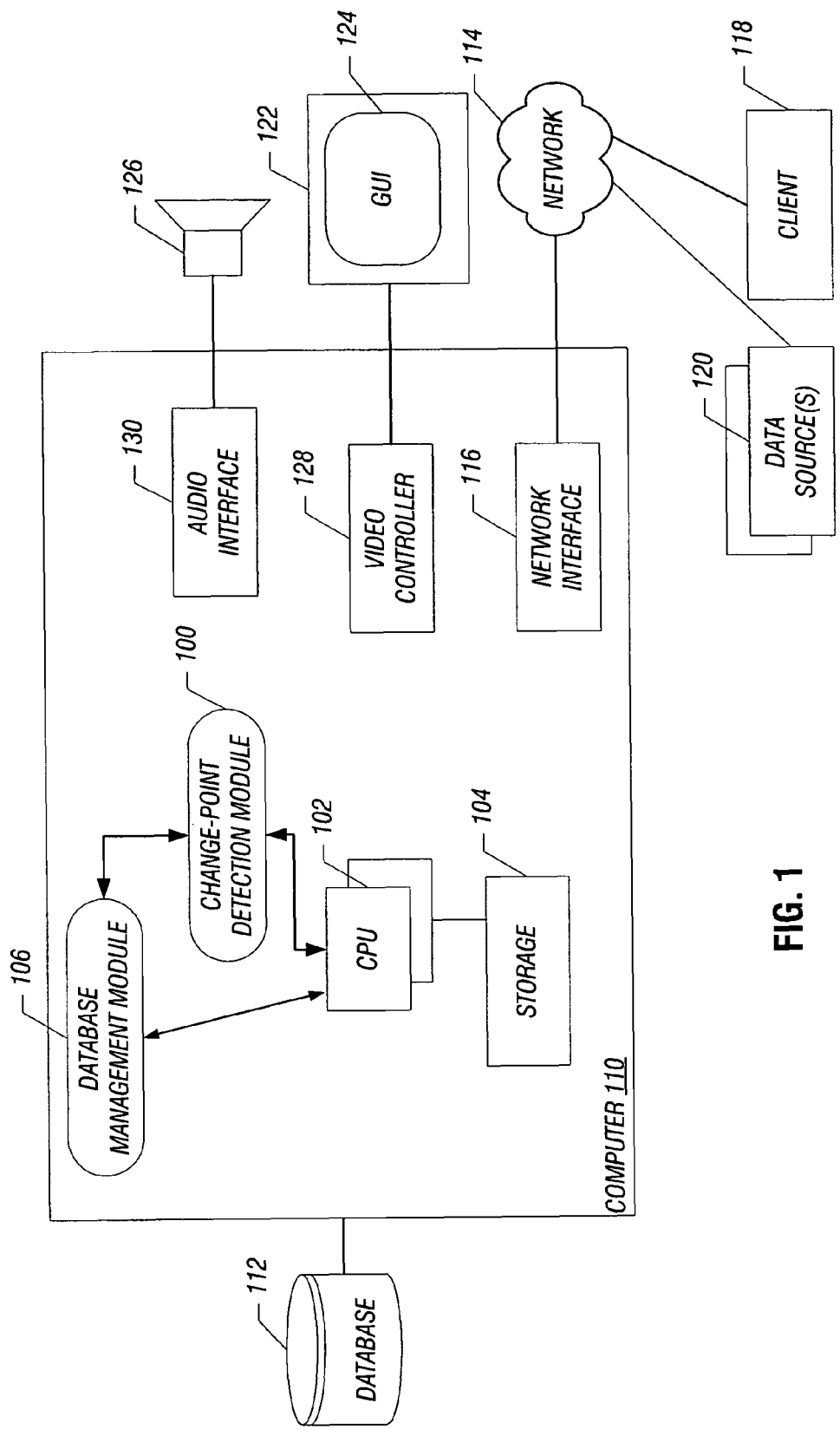
FIG. 1 is a block diagram of a system in which a change-point detection module according to an embodiment is executable.

FIG. 1 shows an example system that includes a change-point detection module 100 that is executable on one or plural central processing units (CPUs) 102 in a computer 110 (or in multiple computers). The computer 110 can be a desktop computer, notebook computer, server computer, personal digital assistant (PDA), or other type of computing device. In some embodiments, the change-point detection module 100 is implemented in software. In other embodiments, the change-point detection module can be implemented in hardware, or in a combination of hardware and firmware.

The one or plural CPUs 102 are coupled to a storage 104 (which can include volatile memory, non-volatile memory, and/or a mass storage device). The computer 110 also includes a database management module 106 that is executable on the one or plural CPUs 102. Alternatively, the database management module 106 can be executable on a computer that is separate from the computer 110 on which the change-point detection module 100 is executed. The database management module 106 manages the access (read or write) of data stored in a database 112. The database 112 can be implemented in storage device(s) connected to the computer 110, or alternatively, the database 112 can be implemented in a server or other computer coupled over a data network, such as data network 114.

The computer 110 communicates over the data network 114 through a network interface 116. Example devices or systems that are coupled to the data network 114 include a client 118 and one or plural data sources 120. The data sources 120 (which can be associated with different organizations, departments within an organization, or other types of entities) are able to collect data that is then transmitted over the data network 114 and through the computer 110 for storing in the database 112.

The change-point detection module 100 checks for a systematic change in data stored in the database 112. Examples of data that can be stored in the database 112 include retail or wholesale sales data, invoice data, production volume data, inventory data, revenue data, financial data, cost data, quality control data, and other forms of data. In response to detecting a systematic change in data, the change-point detection module 100 is able to provide an alert (e.g., an alarm) to a user of a time point (also referred to as a "change point") at which the systematic change in data occurred. Note that the change-point detection module 100 is also able to check for systematic changes in data of other databases aside from database 112.

As noted above, a "systematic change" or "structural change" in data results from some change in a particular system that produced the data, where the data change results from an underlying change in the system rather than from data change occurring as a result of normal operation of the system. The term "systematic change" is often used in the industry context, whereas the term "structural change" is often used in the economics context. In this description, the terms "systematic change" and "structural change" are interchangeably used and refer to any change in data that results from a change in the system that produced the data.

In some embodiments, the change-point detection module 100 detects a change point in a time series of data values (stored in the database 112 or elsewhere) by first computing aggregate values corresponding to the data values. The time series of data values is also referred to as a time series of "observations" or "observed data values." Aggregate values are computed by performing aggregation of the observed data values. The aggregate values are also represented as a time series. In one embodiment, the aggregate values are cumulative sum values. In other embodiments, other types of aggregate values based on other forms of aggregation (e.g., average, minimum, maximum, etc.) can be employed.

In accordance with some embodiments, the change-point detection module 100 performs linear fitting (such as linear regression fitting) onto curve segments representing the aggregate values. In some embodiments, at least two curve segments representing the aggregate values are defined. The curve segments are segments of a curve representing the time series of aggregate values (e.g., cumulative sum values). Linear fitting is performed to fit line segments onto the respective curve segments representing the aggregate values. In one embodiment, linear fitting is performed by building linear regression models with respect to the curve segments. In other embodiments, other forms of fitting can be performed, including non-linear fitting.

Each curve segment represents a respective set of aggregate values. For example, if a curve representing a time series of aggregate values is divided into two curve segments, then the two curve segments represent two respective sets of the aggregate values (also referred to as "aggregate value sets"). If the time series of aggregate values is divided into two aggregate value sets, these two aggregate value sets are referred to collectively as a pair of aggregate value sets. In other embodiments, a time series of aggregate values can be divided into a larger number of aggregate value sets. Change point detection is based on the fittings (e.g., linear fittings) performed by the change-point detection module 100 with respect to the aggregate value sets (two or more). In the ensuing discussion, change point detection is discussed in the context of dividing a time series of aggregate values into two (a pair of) aggregate value sets. However, it is noted that the described techniques are applicable to embodiments in which the time series of aggregate values is divided into greater than two aggregate value sets.

In the analysis according to an embodiment performed by the change-point detection module 100 to find a change point, multiple pairs of aggregate value sets are defined. The numbers of members of the aggregate value sets are varied in the multiple pairs of aggregate value sets such that the aggregate value sets in one pair have differing numbers of members than aggregate value sets in another pair. For example, for a time series of n aggregate values that is divided into two aggregate value sets, a first pair of aggregate value sets can have a first aggregate value set with m aggregate values, and a second aggregate value set with n−m aggregate values. In a second pair of aggregate value sets, the number of aggregate values in a first aggregate value set is k (k≠m), and the number of aggregate values in a second aggregate value set is n−k. A linear fitting is performed with respect to each of the first and second pairs of aggregate value sets. Additional pairs of aggregate value sets are further defined, with further fittings performed on these additional pairs of aggregate value sets.

Comparisons of the fittings performed on the multiple pairs of aggregate value sets are performed to identify an optimal fit, which identifies the pair of aggregate value sets (from among the multiple pairs of aggregate value sets) associated with the optimal fit. This identified pair of aggregate value sets associated with the optimal fit provides the indication of the change point (the time point at which a systematic change in observed data values occurs).

In some embodiments, the comparisons to identify an optimal fit are based on a goodness-of-fit analysis performed for each of the linear regression models built for respective pairs of aggregate value sets. Measures of the goodness-of-fit analyses are then computed and compared to determine the optimal fit from among the linear fits performed on the multiple pairs of aggregate value sets. A goodness-of-fit measure is computed for how well each line segment (for the linear fitting) fits onto the corresponding curve segment representing an aggregate value set. The goodness-of-fit measure can be one of any number of measures, including R-squares, adjusted R-squares, AIC (Akaike's Information Criterion), BIC (Bayesian Information Criterion), and other goodness-of-fit measures.

In some implementations, once a change point is detected, an alert provided by the change-point detection module 100 can be presented to a display monitor 122 (that is able to display a graphical user interface or GUI 124) or an audio output device 126 of the computer 110. Thus, the change-point detection module 100 is able to provide either a visual and/or audio alert to a user in response to a systematic change in data. The display monitor 122 is coupled to a video controller 128 in the computer 110, and the audio output device 126 is coupled to an audio interface 130 in the computer 110. Alternatively, the change-point detection module 100 is also able to communicate an alert of a systematic data change over the data network 114 to a remote computer, such as the client 118. The alert enables a user to act upon the systematic change in data. The alert can be in the form of a report or other indication.

Figure 2:
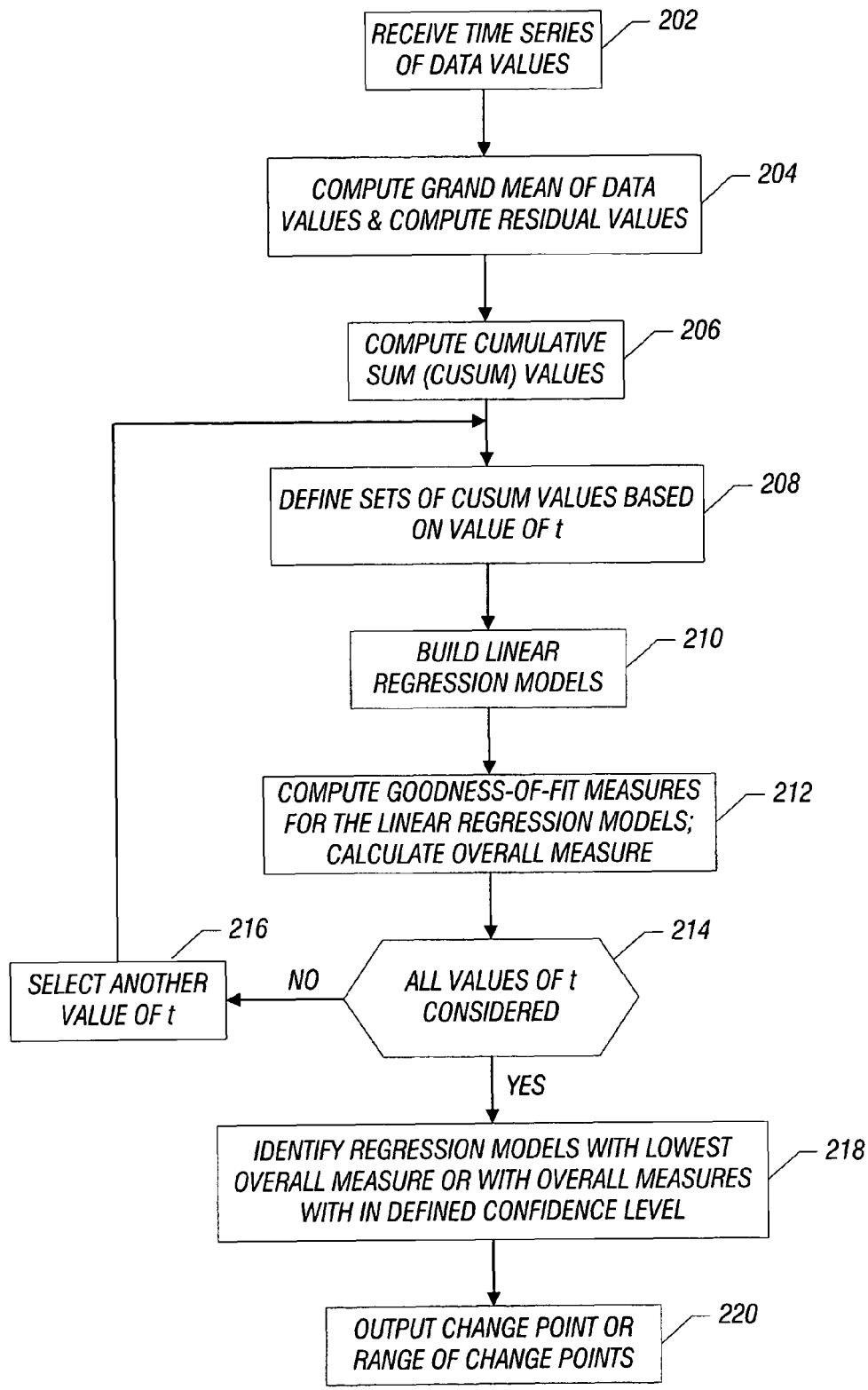
FIG. 2 is a flow diagram of a process performed by the change-point detection module of FIG. 1, in accordance with an embodiment.

A process performed by the change-point detection module 100 according to an embodiment is illustrated in FIG. 2. Reference is also made to FIGS. 3-7 in the following discussion. The change-point detection module 100 receives (at 202) a time series of observed data values $y_t$, represented as $\{y_t: t=1, 2, \ldots, n\}$, where t represents time, and n is the latest time point to be considered for the change-point detection analysis. The time series of observed data values can be received from the database 112 or from some other data source.

Figure 3:
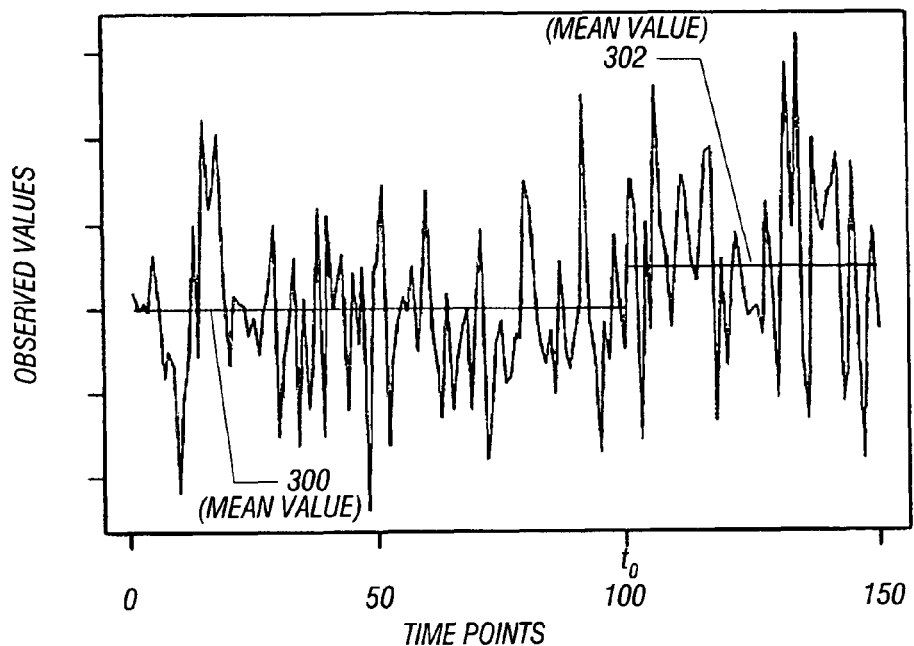
FIG. 3 is a graph showing a time series of observed data values associated with a change point detectable by the change-point detection module according to an embodiment.

The observed data values are depicted in FIG. 3, which is a graph of the observed data values over time. Note that two lines, 300 and 302, are shown in FIG. 3, where line 300 represents the mean value of a first group of observed values, and the line 302 represents the mean value of a second group of observed values. The shift in the mean values represented by lines 300 and 302 indicate that a systematic change has occurred at time point $t_0$. Thus, in the example of FIG. 3, time point $t_0$ represents the change point.

Next, a grand mean of the observed data values, $\bar{y}=\Sigma_{t=1}^{n} y_t/n$, is computed (at 204). In addition, residuals are also computed (at 204), where the residuals represent the difference in values between the observed data values and the grand mean, $r_t=y_t-\bar{y}$, for t=1, 2, . . . , n.

The change-point detection module 100 also computes (at 206) aggregate values, in one example cumulative sum (CUSUM) values. In other examples, other types of aggregations can be performed, such as aggregations associated with a generalized likelihood ratio (GLR) algorithm or other aggregation algorithms.

Figure 4:
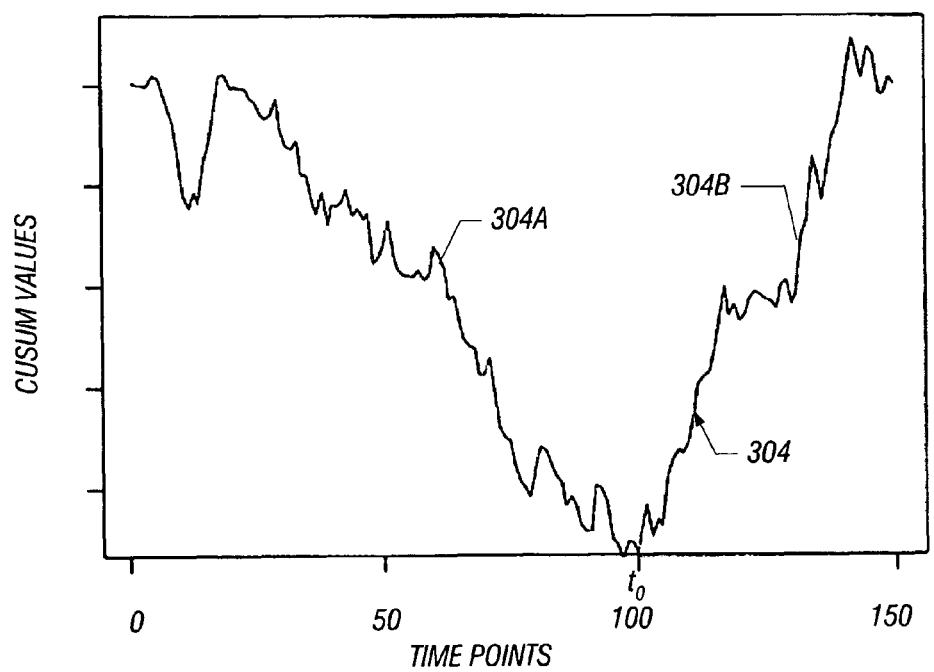
FIG. 4 is a graph showing a time series of cumulative sum values computed by the change-point detection module according to an embodiment to detect a change point in the data values.

The cumulative sums are calculated based on the residual values $r_t$, with a time series of the cumulative sums represented as $\{c_t\}$, where $c_t=\Sigma_{i=1}^{t} r_i$, for $t=1, 2, \ldots, n$. FIG. 4 depicts the time series of cumulative sum values, $\{c_t\}$, that correspond to the time series of observed data values, $\{y_t\}$. The curve 304 representing the cumulative sum values has generally a V-shape. In this generally V-shaped curve 304, two curve segments are present, curve segment 304A and curve segment 304B. The curve segment 304A occurs prior to change point $t_0$, and the curve segment 304B occurs after change point $t_0$. Thus, prior to change point $t_0$, the cumulative sum values have a negative slope, and after change point $t_0$, the curve segment 304B has a positive slope. The change in slopes of curve segments 304A and 304B occur as a result of a systematic change in the observed values occurring at change point $t_0$. This behavior of the cumulative sum values is used by the change-point detection module 100 to detect the change point, as described further below. Note that in a different example for a different time series of data values, the time series of cumulative sums can have a reverse V-shape. Also, in other examples, multiple change points may be present in a time series of observed data values, in which case more than two distinct curve segments can be defined.

In accordance with some embodiments of the invention, at least two sets of cumulative sum values are defined (at 208), a first cumulative sum set corresponding to a first curve segment of the curve 304, and a second cumulative sum set corresponding to a second curve segment. In other embodiments, additional sets of cumulative sum values can be defined. The cumulative sum sets described here refer to the aggregate value sets discussed above. The time series of cumulative sum values are partitioned into the following pair of cumulative sum sets: $\{c_1, \ldots, c_{t-1}\}$, $\{c_t, \ldots, c_n\}$. The first cumulative sum set of the pair includes cumulative sum values $c_1, \ldots, c_{t-1}$, and the second cumulative sum set of the pair includes cumulative sum values $c_t, \ldots c_n$, where the value of t is selected from a possible change point (PCP) set $\{2, 3, \ldots, n-1, n\}$. Thus, for example, if the value of t is 5, then the first cumulative sum set includes cumulative sum values $c_1, c_2, c_3$, and $c_4$, and the second cumulative sum set includes $c_5, \ldots, c_n$. If the value of t is 2, then the first cumulative sum set includes one cumulative sum value $c_1$, and the second cumulative sum set includes cumulative sum values $c_2, \ldots, c_n$. The t value is varied (by selecting from the PCP set) to vary the numbers of members in the first and second cumulative sum sets in different pairs of the cumulative sum sets. Effectively, each cumulative sum set in the pair contains a number of members that is based on the value of t. In performing the change-point detection analysis, the change-point detection module 100 varies the value of t to obtain multiple pairs of cumulative sum sets.

At step 208, a first value of t is selected to define the first pair of cumulative sum sets, where t is selected from $t=2, \ldots, n$. A linear regression model is built (at 210) by the change-point detection module 100 for each of the two cumulative sum sets in the pair. Building a linear regression model for each of the two cumulative sum sets refers to performing a linear regression fitting onto curve segments of the curve 304. Other types of fitting, including non-linear fitting, can be performed in other embodiments.

Figure 5:
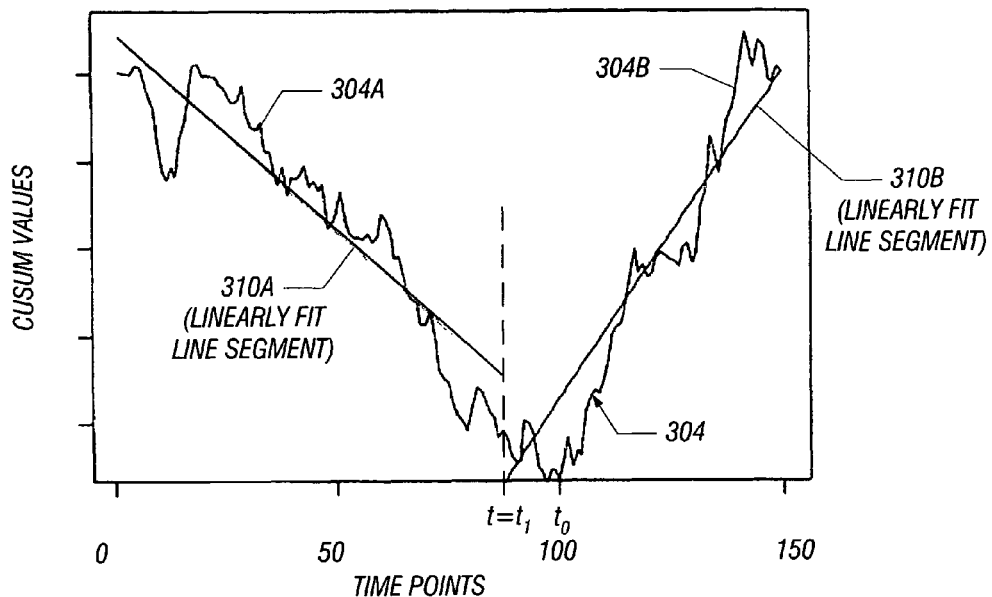
FIG. 5 is a graph illustrating linear fitting onto curve segments representing the cumulative sum values, in accordance with an embodiment.

An example of linear fitting onto the two curve segments is depicted in FIG. 5, where t is set to a value $t_1$ less than $t_0$ (the change point). In FIG. 5, the first cumulative sum set (in the pair) contains $\{c_1, \ldots, c_{t_1-1}\}$, and the second cumulative sum set (in the pair) contains $\{c_{t_1}, \ldots, c_n\}$. A line segment 310A is linearly fit onto the first curve segment (representing $\{c_1, \ldots, c_{t_1-1}\}$), and the line segment 310B is linearly fit onto the second curve segment (representing $\{c_{t_1}, \ldots, c_n\}$).

More formally, in building a linear regression model for each of the cumulative sums sets, a response variable includes the cumulative sum values in each set, and an explanatory variable includes the time point values. Linear regression attempts to model the relationship between two variables (the response variable and explanatory variable) by fitting a linear equation to data (in this case, the aggregated data values, e.g., cumulative sum values). Note that for $t=2$ or $t=n$, regression is not performed on the set with one cumulative sum value, but the regression is performed on the other set. Specifically, note that when $t=2$, the first cumulative sum set in the pair contains only a single value $c_1$, taken at time point 1, and thus a regression fitting does not have to be performed for this set. The second cumulative sum set in the pair contains values $\{c_2, c_3, \ldots, c_n\}$, taken at time points $2, 3, \ldots, n$. A linear regression fit is performed on this set. When $t=n$, the first cumulative sum set in the pair contains values $c_1, c_2, \ldots, c_{n-1}$, taken at time points $1, 2, \ldots, n-1$, and a linear regression fitting is performed on this set. The second cumulative sum set in the pair in this case has only a single value $c_n$, taken at time point n, and a regression fitting does not have to be performed for this set. For other values of t ($t=2, 3, \ldots, n-1$), there will be two cumulative sum sets in the pair, each containing more than one value, and a regression fitting is performed on each of the sets.

Next, the change-point detection module 100 computes (at 212) a goodness-of-fit measure for each linear regression model. In other words, a goodness-of-fit measure is computed for how well each line segment 310A, 310B fits onto the corresponding curve segment representing a cumulative sum set. Two goodness-of-fit measures are computed, one for each cumulative sum set in a pair, for the current value of t. These two goodness-of-fit measures are summed to form an overall goodness-of-fit measure for the two line segments partitioned at the time point t. Note that for $t=2$ or $t=n$, only one linear regression model is built, so that only one goodness-of-fit measure is computed and used as the overall goodness-of-fit measure. A better fit is indicated by a lower value of the goodness-of-fit measure in some implementations. In other implementations, a better fit is indicated by a higher or some other value of the goodness-of-fit measure. The overall goodness-of-fit measure is referred to as a detection measurability value (DMV).

The change-point detection module 100 next checks (at 214) to determine if all values of t (from the PCP set) have been considered. If not, another value of t is selected (at 216), and the change-point detection module 100 proceeds back to step 208 to repeat steps 208, 210, and 212.

Figure 6:
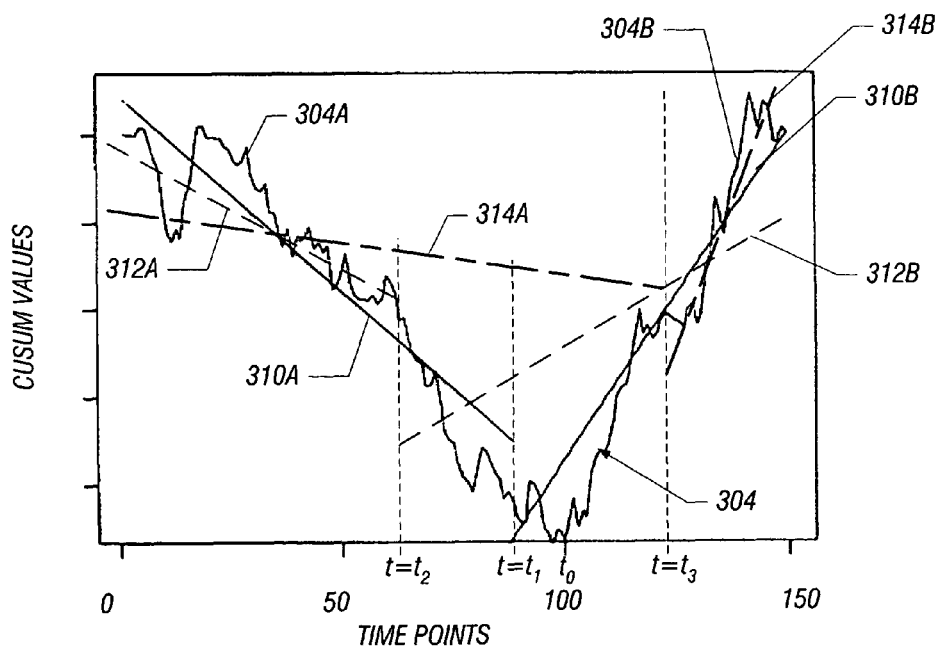
FIG. 6 is a graph showing multiple linear fittings onto curve segments representing the cumulative sum values, in accordance with an embodiment.
Figure 7:
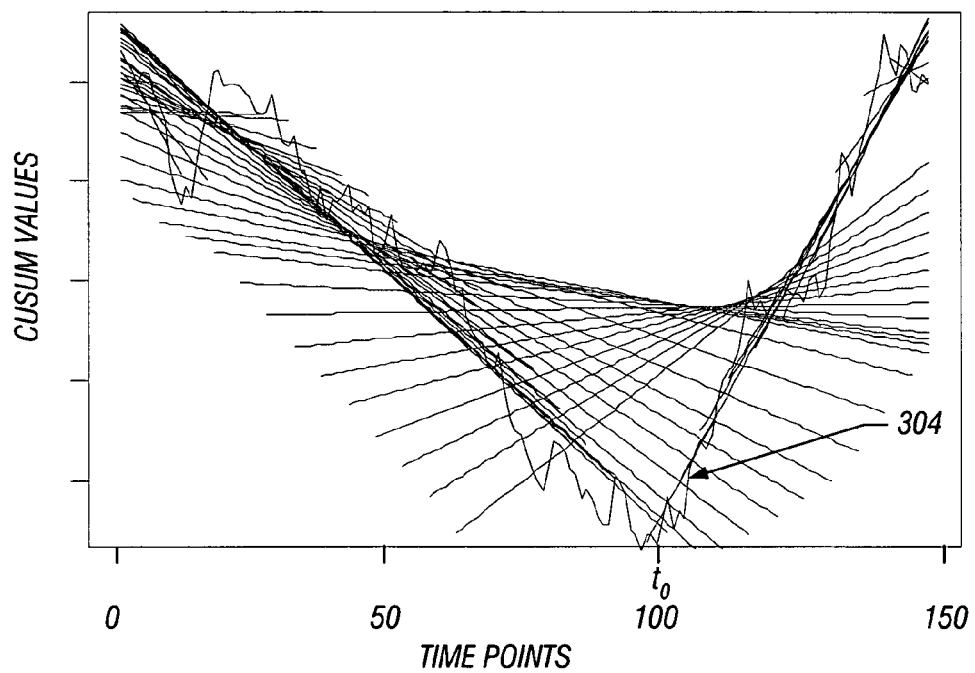
FIG. 7 is a graph showing a larger number of linear fittings onto curve segments representing the cumulative sum values, in accordance with an embodiment.
Figure 8:
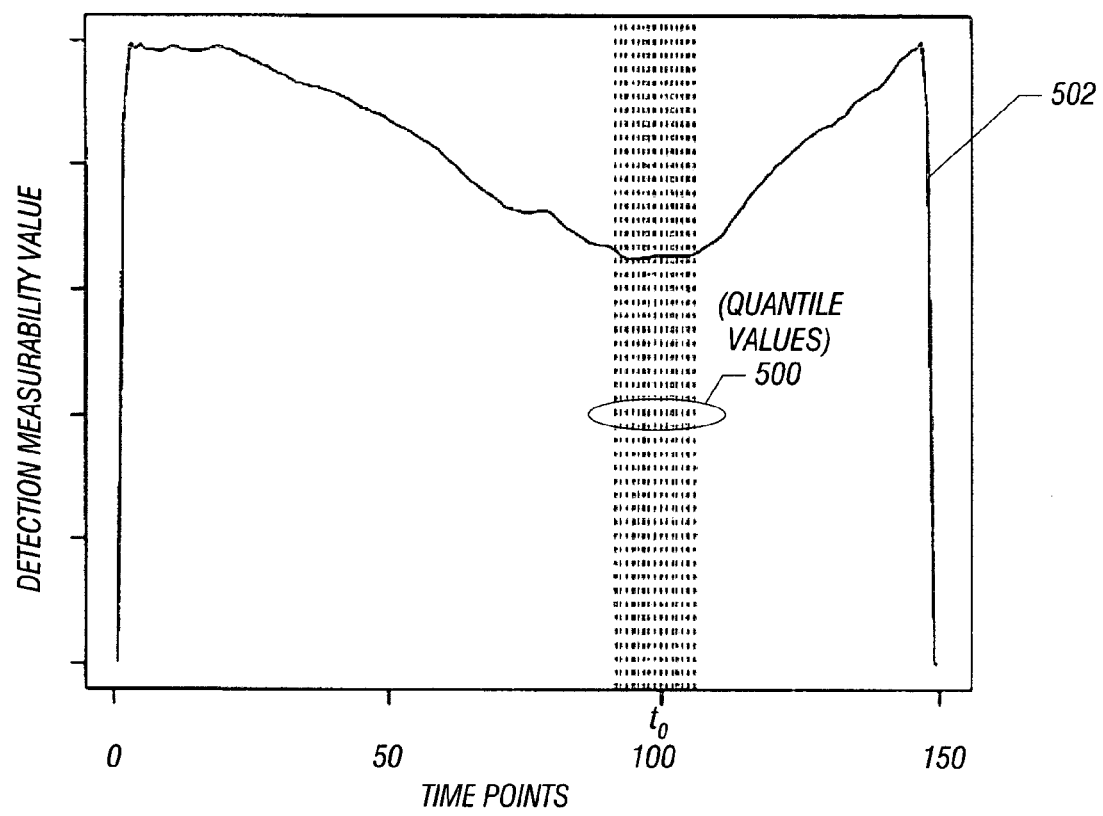
FIG. 8 is a graph of detection measurability values over time, as computed by the change-point detection module according to an embodiment.

As the value of t is varied, different line segments are fitted onto the respective curve segments corresponding to the changing cumulative sum sets. For example, as depicted in FIG. 6, the value of t has been varied among $t_1$, $t_2$, and $t_3$. For the value $t=t_2$, the line segments 312A and 312B are fitted onto curve segments corresponding to the pair of cumulative sum sets for $t=t_2$. Similarly, for $t=t_3$, two line segments 314A and 314B are fitted onto respective curve segments corresponding to the pair of cumulative sum sets for $t=t_3$. Note that the line segments 310A, 310B have better fits onto respective curve segments of the curve 304 than line segments 312A, 312B, and 314A, 314B, in view of the fact that the line segments 310A, 310B are fitted onto curve segments for $t=t_1$, which is closer in value to $t_0$ than $t_2$ and $t_3$. As the value of t approaches $t_0$, the fitting becomes better, as indicated by the goodness-of-fit measure. Detection of the optimal fit, indicated by the lowest goodness-of-fit measure in some implementations allows the change-point detection module 100 to find change point $t_0$, or a value of t close to $t_0$. FIG. 7 shows a larger number of linear fittings, where t has been varied across t=2, 3, . . . , n−1.

If all values of t have been considered, as determined at 214, the change-point detection module 100 identifies (at 218) the pair of cumulative sum sets associated with regression models having the lowest DMV. This pair of cumulative sum sets corresponds to a particular value of t, which is identified as the change point. In some embodiments, if a single value for the change point is desired, then the change point is identified as the time point where the DMV attains its optimal (e.g., minimum or maximum) value. This change point is output (at 220) by the change-point detection module 100 (such as in the form of an alert).

On the other hand, if a range of time points is desired, then the following is performed. A confidence level, such as 1−α=90%, is set to identify the most likely values for the change point in the possible change point set. Then the quantile value of the possible change point set is computed at level a. Effectively, in the example where the confidence level is 1−α=90%, the quantile value of the possible change point set at level a, in this example 10%, is computed by finding the values of the DMV that are within 10% of the minimum DMV (in other words, these values of the DMV satisfy the set confidence level). An example is illustrated in FIG. 7, where the DMV (represented by curve 502) includes AIC values, and the time points indicated by dashed lines 500 correspond to the quantile values of DMV. In this scenario, the range of time points is output (at 220) as possible change points. A user can study this range of possible change points to determine which is the most likely change point, if a single point for change is desired to be identified from the range.

By performing linear fitting onto curve segments representing respective aggregate value sets, identification of a change point (or plural possible change points) is based on goodness-of-fit measurements so that a threshold value does not have to be predefined. As a result, without having to predefine a threshold value, false alarms or detection delays associated with inaccurately set threshold values can be avoided or reduced.

The change-point detection module 100 of FIG. 1 can be implemented in software. Instructions of the software are loaded for execution on a processor (such as CPU(s) 102 in FIG. 1). The processor includes a microprocessor, microcontroller, processor module or subsystem (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices (such as storage 104 in FIG. 1), which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
    computing, by a processor, aggregation of data values in a data set to produce aggregate values;
    partitioning, by the processor, the aggregate values into plural groups of aggregate value sets;
    performing, by the processor, fittings with respect to the plural groups of aggregate value sets, wherein performing the fitting for each of the plural groups comprises building linear regression models for curve segments representing respective aggregate value sets in the corresponding group;
    determining, by the processor based on the fittings, at least one time point corresponding to occurrence of a change in the data values;
    calculating measures representing goodness-of-fit for respective fittings;
    setting a confidence level;
    finding values of the calculated measures representing goodness-of-fit that satisfy the confidence level, wherein determining the at least one time point comprises determining a range of time points based on values of the calculated measures that satisfy the confidence level.

2. The method of claim 1, wherein building the linear regression models performs linear fitting with respect to the plural aggregate value sets in each of the plural groups, and wherein determining the at least one time point is based on the linear fittings.

3. The method of claim 1, wherein the plural groups of aggregate value sets comprise plural groups of sets of cumulative sums, and
    wherein performing the fittings is with respect to the plural groups of sets of cumulative sums.

4. A method comprising:
    computing, by a processor, aggregation of data values in a data set to produce aggregate values;
    partitioning, by the processor, the aggregate values into plural groups of aggregate value sets;
    performing, by the processor, fittings with respect to the plural groups of aggregate value sets, wherein performing the fitting for each of the plural groups comprises building linear regression models for curve segments representing respective aggregate value sets in the corresponding group; and
    determining, by the processor based on the fittings, at least one time point corresponding to occurrence of a change in the data values;
    calculating goodness-of-fit measures for respective fittings;
    combining the goodness-of-fit measures for respective groups of aggregate value sets to derive respective detection measurability values; and
    comparing the detection measurability values, wherein determining the at least one time point is further based on identifying a time point where the detection measurability values attain an optimal value.

5. The method of claim 4, wherein calculating the goodness-of-fit measures comprises calculating at least one of R-squares measures, adjusted R-squares measures, AIC (Akaike's Information Criterion) measures, and BIC (Bayesian Information Criterion) measures.

6. The method of claim 4, wherein determining the at least one time point comprises determining the at least one time point for a systematic change in the data values.

7. A method comprising:
computing, by a processor, aggregation of data values in a data set to produce aggregate values;
partitioning, by the processor, the aggregate values into plural aggregate value sets;
performing, by the processor, fitting with respect to the plural aggregate value sets; and
determining, by the processor based on the fitting, at least one time point corresponding to occurrence of a change in the data values,
wherein the aggregate values comprise a time series of aggregate values, and wherein the plural sets of aggregate values comprise a first aggregate value set $\{c_1, \ldots, c_{t-1}\}$ and a second aggregate value set $\{c_t, \ldots, c_n\}$, where t is variable and n represents a latest time point in the time series, the method further comprising:
selecting a first value for t, wherein performing the fitting is with respect to the first and second aggregate value sets for the first value of t;
selecting other values of t;
performing further fittings with respect to the first and second aggregate value sets for the other values of t,
wherein determining the at least one time point is further based on the further fittings;
calculating measures representing goodness-of-fit for respective fittings;
setting a confidence level;
finding values of the calculated measures representing goodness-of-fit that satisfy the confidence level, wherein determining the at least one time point comprises determining a range of time points based on values of the calculated measures that satisfy the confidence level.

8. The method of claim 7, wherein selecting other values of t comprises selecting other values of t from a possible change point set $\{2, 3, \ldots, n-1, n\}$.

9. A method comprising:
computing, by a detection module executing on a processor in a system, a time series of aggregate values corresponding to a time series of data values;
partitioning, by the detection module executing on the processor, the time series into at least two aggregate value sets containing the aggregate values;
performing, by the detection module executing on the processor, fitting with respect to the at least two aggregate value sets;
determining, based on the fitting, a change in the time series of data values;
varying numbers of members in the at least two aggregate value sets; and
performing further fitting with respect to the at least two aggregate value sets after varying the numbers of members in the at least two aggregate value sets,
wherein determining the change in the time series of data values is further based on the further fitting;
calculating measures representing goodness-of-fit for respective fittings;
setting a confidence level;
finding values of the calculated measures representing goodness-of-fit that satisfy the confidence level, wherein determining the at least one time point comprises determining a range of time points based on values of the calculated measures that satisfy the confidence level.

10. The method of claim 9, wherein determining the change comprises determining a systematic change in the time series of data values.

11. The method of claim 9, wherein performing the fittings comprises performing linear fittings with respect to the at least two aggregate value sets, and wherein determining the change in the time series of data values is based on the linear fittings.

12. The method of claim 11, wherein performing each linear fitting comprises fitting at least two line segments with respect to the at least two aggregate value sets.

13. The method of claim 12, wherein fitting the at least two line segments with respect to the at least two aggregate value sets comprises fitting the at least two line segments onto curve segments representing the at least two aggregate value sets.

14. A system comprising:
a storage to store a time series of aggregate values;
a processor; and
a detection module executable on the processor to:
perform linear fitting onto at least two curve segments representing the time series of the aggregate values; and
determine, based on the linear fitting, a change in data,
wherein the time series of aggregate values is partitioned into at least a first aggregate value set $\{c_1, \ldots, c_{t-1}\}$ and a second aggregate value set $\{c_t, \ldots, c_n\}$, the at least two curve segments representing the first and second aggregate value sets, where t is variable and n represents a latest time point in the time series, the detection module to further:
select a first value for t, wherein the linear fitting is performed with respect to the first and second aggregate value sets for the first value of t;
select other values of t;
perform further fittings with respect to the first and second aggregate value sets for the other values of t,
the detection module to determine the at least one time point further based on the further fittings.

15. The system of claim 14, wherein the detection module is executable on the processor to determine, based on the fittings, a systematic change in the data.

16. The system of claim 14, wherein the detection module is executable on the processor to identify a change point in determining the change in data.

17. The method of claim 14, wherein the other values of t are selected from a possible change point set $\{2, 3, \ldots, n-1, n\}$.

18. At least one machine-readable storage medium storing instructions that when executed by a processor cause a system to:
compute aggregation of data values in a data set to produce aggregate values;
partition the aggregate values into a first group of aggregate value sets;
perform fitting with respect to the first group of aggregate value sets;
partition the aggregate values into a second group of aggregate value sets; and
perform further fitting with respect to the second group of aggregate value sets,
determine, based on the fittings, at least one time point corresponding to occurrence of a change in the data values.

19. The at least one storage medium of claim 18, wherein performing the fittings comprises performing linear fittings with respect to the first and second groups of aggregate value sets, and wherein determining the at least one time point is based on the linear fittings.

20. The at least one storage medium of claim 18, the instructions when executed cause the system to further:
calculate goodness-of-fit measures for respective fittings, wherein determining the at least one time point is based on the goodness-of-fit measures.

21. At least one storage medium storing instructions that when executed by a processor cause a system to:
compute aggregation of data values in a data set to produce aggregate values;
partition the aggregate values into plural aggregate value sets;
perform fitting with respect to the plural aggregate value sets; and
determine, based on the fitting, at least one time point corresponding to occurrence of a change in the data values,
wherein partitioning the aggregate values into the plural aggregate value sets comprises partitioning the aggregate values into a first group of aggregate value sets, and wherein performing fitting with respect to the plural aggregate value sets comprises performing fitting with respect to the first group of aggregate value sets, the instructions when executed causing the system to further:
partition the aggregate values into additional groups of aggregate value sets;
perform further fittings with respect to the additional groups of aggregate value sets;
calculate goodness-of-fit measures for respective fittings;
combine the goodness-of-fit measures for respective groups of aggregate value sets to derive respective detection measurability values; and
compare the detection measurability values,
wherein determining the at least one time point is further based on identifying a time point where the detection measurability values attain an optimal value.

22. A system comprising:
a storage to store a time series of aggregate values corresponding to a time series of data values; and
a processor to:
partition the time series of aggregate values into at least a first cumulative sum set $\{c_1, \ldots, c_{t-1}\}$ and a second cumulative sum set $\{c_t, \ldots, c_n\}$, where t is variable and n represents a latest time point in the time series of aggregate values;
select a first value for t;
build linear regression models for the first and second cumulative sum sets for the first value of t;
select other values of t;
build linear regression models for the first and second cumulative sum sets for the other values of t;
compute goodness-of-fit measures for the linear regression models for the different values of t;
determine at least one time point corresponding to a systematic change in the time series of data values based on comparisons of the goodness-of-fit measures.

* * * * *